July 16, 1929. J. A. TOLEIK 1,720,934
BALANCED DIAPHRAGM PRINCIPLE FOR TESTING CANS
Filed May 23, 1927
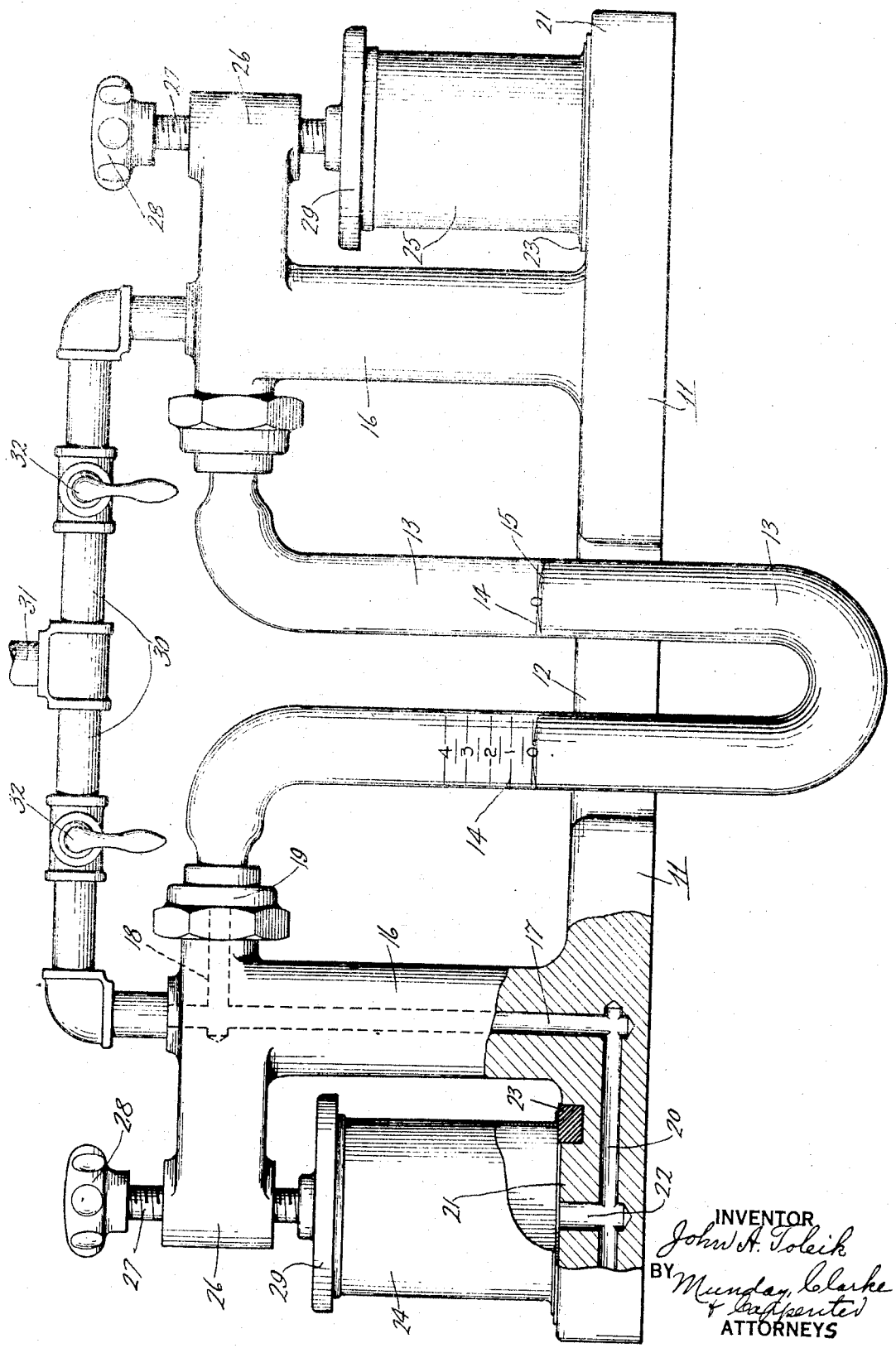

Patented July 16, 1929.

1,720,934

UNITED STATES PATENT OFFICE.

JOHN A. TOLEIK, OF WEST ORANGE, NEW JERSEY, ASSIGNOR TO AMERICAN CAN COMPANY, OF NEW YORK, N. Y., A CORPORATION OF NEW JERSEY.

BALANCED-DIAPHRAGM PRINCIPLE FOR TESTING CANS.

Application filed May 23, 1927. Serial No. 193,441.

This invention relates in general to the testing of cans or other receptacles for faults and leakage by a balanced diaphragm principle, in which a receptacle to be tested is compared with a master can of the same content which is known to be free from leakage.

The principal object of the invention is the provision of an easily operable testing apparatus, which has a simple and dependable operation permitting rapid application of receptacles thereto which are to be tested.

A further important object of the invention is the provision of visible means for quickly showing the condition indicated of the can or other receptacle under observation.

Numerous other objects and advantages of the invention will be apparent as it is better understood from the following description, which, taken in connection with the accompanying drawings, discloses a preferred embodiment thereof.

In the drawing:

The figure is an elevation, with parts shown in section for clearness of a testing apparatus constructed in accordance with the principles of this invention.

In carrying out this invention, a can or receptacle to be tested is compared with a master receptacle of substantially the same capacity, by providing pressure connections at opposite ends of a U-tube in which there is a liquid diaphragm, and with means for applying pressure simultaneously to the receptacles, thereafter shutting off the pressure so that any leakage in one of the receptacles is quickly visible by a movement of the liquid diaphragm or seal.

Referring more particularly to the drawing; a base 11 is formed with a central recess 12 for receiving a U-tube 13, preferably of glass, with graduations 14 and adapted to contain a column or quantity of liquid 15, such, for example, as mercury, to form a seal or movable diaphragm between the ends of the U-tube.

Beyond the ends of the U-tube 13 are upright projections 16 of the base 11, each of which has a vertical bore 17 and a horizontal bore 18 communicating therewith and connected to the adjacent end of the U-tube by means of a suitable fluid tight joint 19. Connecting with the bore 17 at the bottom is a horizontal passage 20, and extending upwardly from the passage 20, at the center of a testing seat 21, is a connected passage 22.

Surrounding the opening in each testing seat 21 is a recess for containing a resilient packing ring 23, preferably of rubber, or a similar packing material, of a suitable size to engage the downturned, open end of a can 24, or other receptacle to be tested, at one side, and to receive a master receptacle 25 at the other side.

To hold each receptacle tightly upon its seat, the upright 16 is preferably formed with an integral arm 26, which extends over the testing seat, and threaded through each arm is a correspondingly threaded stem 27 having a handle 28 at the upper end and a bearing plate 29 at the lower end adapted to engage a receptacle 24 or 25 and to press it tightly against the sealing ring 23 in the base.

Connecting the upper ends of the vertical bores 17 is a pipe line 30 with a central T connected to a pressure pipe 31 and with side valves 32 for separately controlling the admission of pressure from the pipe 31 to the ends of the U-tubes and to the receptacles through the bores or passages 17, 18, 20 and 22.

In operation, the standard or master receptacle 25 is placed in position and firmly secured upon its seat, and if a number of receptacles of the same size are to be tested, the master receptacle is retained in place, and the ones to be tested are applied in the other position and secured in place by the corresponding clamping means. Pressure is applied by opening both valves 32 and admitting the same amount of fluid under pressure at both sides of the U-tube, filling the receptacles 24 and 25. If the same amount of fluid under pressure is admitted to both sides, and there is no leak, the fluid or mercury column will remain substantially stationary; if more fluid under pressure is admitted at one side than the other, the legs of the fluid under pressure will be unequal in the U-tube; and if after admitting the fluid under pressure at both sides of the U-tube the valves 32 are then closed the sealing liquid 15 will stand in a stationary position within the U-tube, providing there are no leaks in the receptacles or other connections on either side of the U-tube. If there is a leak at one side, the pressure will greatly diminish on that side, causing the sealing liquid 15 to rise on that side of the U-tube, thus clearly and visually indicating the leak.

With this apparatus, the leak is thus localized in the receptacle under test and the structure for applying the receptacles to be tested is so simple in operation that the receptacles can be easily and quickly inserted and removed with the least possible delay. Care must be taken in simultaneously applying and releasing the pressure applied at the ends of the U-tube and to the receptacles under test, as an unbalance of pressure tends to blow the sealing liquid out of the tube 13. It is desirable, although not absolutely necessary, to have the opposite passages and the capacities of the receptacles under test substantially the same, so that there is no material movement of the sealing liquid in the U-tube when pressure is applied to the ends of the U-tube by opening the two valves 32 at the same time. Unequal opening of the two valves 32 will result in raising the sealing liquid in one leg of the U-tube, but this can be manipulated to equalize the height of liquid in the opposite sides of the tube. Even if the liquid is higher at one side of the tube, if the valves 32 are both shut off, a leak in the receptacle on test will cause a variation in the U-tube, which is easily discernible.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can tester, a U-tube for containing liquid exposed to view, a master receptacle and means for forming a fluid tight connection with one end of the tube, a receptacle to be tested and means forming fluid tight connections with the other end of the tube, and means for admitting fluid under pressure to the receptacles at both ends of the tube.

2. A receptacle testing apparatus comprising a transparent U-tube for containing liquid, means for forming a fluid tight connection with a receptacle at each end of the tube, a liquid exposed to view and disposed in the tube for constituting a variable diaphragm, means for applying pressure to the receptacles at the ends of the tube and for cutting off the pressure thus applied, the movement of the diaphragm thereafter indicating a leak in one of the receptacles.

3. A balanced diaphragm tester for cans and the like, comprising a transparent U-tube and a sealing liquid contained therein, a pair of receptacles, and means for separately connecting them without leakage to the ends of the tube, means for applying and cutting off the applied pressure to the receptacles at both ends of the tube, the movement of the liquid in the tube after the pressure is cut off visibly showing the leakage in one of the receptacles.

4. A balanced symmetrical diaphragm tester for cans and the like, comprising a transparent tube with a sealing liquid therein to form a diaphragm, means for connecting a master receptacle and a can to be tested at opposite ends of the tube with fluid tight connections of substantially the same capacity, valved means for separately applying pressure at both ends of the tube and for cutting off such pressure when it is applied, the sealing liquid forming a variable diaphragm visible from the outside of the tube to indicate a leak in either the receptacle or the can to be tested.

5. In a can testing apparatus, a graduated transparent U-tube, a pair of receptacle receiving bases with resilient sealing rings adapted to make fluid tight connections with receptacles applied thereto, means forming closed passages connecting said bases with the ends of the U-tube, a common pressure applying connection for both ends of the U-tube, and valved means in said connection for separately admitting fluid under pressure to the ends of the U-tube and for cutting off said pressure when it is thus applied.

6. In a can testing apparatus, a base member having a sealing ring for engaging the edge of a receptacle to be tested, an upright adjacent the sealing ring having a passage therein communicating with the interior of the sealing ring, fluid pressure means applied to the passage, and adjustable means for holding the receptacle on the sealing ring, said means comprising an arm extending from the said upright, a threaded member extending over the arm, an engaging head at one end of the threaded member, and a pressure applying knob at the other end of the threaded member for pressing the head in engagement with a receptacle to be tested.

7. In can testing apparatus, a base having spaced apart receptacle receiving portions, with inset, resilient sealing rings and adjacent uprights with passages communicating with the interior of the sealing rings, a transparent, graduated U-tube having fluid tight connections with the passages in the opposite uprights, means for applying pressure to the ends of the U-tube and said passages, and means in connection with the uprights for holding receptacles in contact with the sealing rings.

8. In a can testing apparatus, the combination of a container providing a non-leaking reference chamber, a can seat, means for clamping the can to its seat, connections between said reference chamber and a can on said seat and including a visible reference diaphragm, and means separately sealing said reference chamber and said can under air pressure different from that of atmospheric air, said diaphragm being sensitive to pressure differential between the can being tested and said reference chamber and acting as a visible indicator of said pressure differential to indicate leak in said can.

9. A symmetrical diaphragm tester for cans and the like, comprising a base member with spaced uprights, can receiving spaces adjacent the uprights, and arms projecting from the uprights over the said spaces; each upright having a passage extending upwardly through the tube and laterally inward and connected at the bottom with a central portion of the can receiving space; a U-tube having fluid tight connections at its ends with the laterally extending passages of the uprights, a flexible sealing ring in each can receiving space, a tubular pressure applying connection with the upper ends of the passages in the uprights; separately operable valves for admitting pressure to said passages of the U-tubes and clamping heads in connection with the overhanging arms for holding cans to be tested against the said sealing rings.

JOHN A. TOLEIK.